United States Patent [19]

Essert

[11] Patent Number: 5,134,678

[45] Date of Patent: Jul. 28, 1992

[54] STRAIN RELIEF FOR OPTICAL FIBER

[75] Inventor: Robert Essert, Glen Ellyn, Ill.

[73] Assignee: Reliance Comm/Tec Corporation, Chicago, Ill.

[21] Appl. No.: 732,798

[22] Filed: Jul. 19, 1991

[51] Int. Cl.⁵ .............................................. G02B 6/36
[52] U.S. Cl. ...................................... 385/86; 385/70
[58] Field of Search .................... 358/86, 69, 70, 136, 358/137, 87

[56]  References Cited

U.S. PATENT DOCUMENTS

| H 595 | 3/1989 | Lafaw | 385/69 |
|---|---|---|---|
| 4,279,468 | 7/1981 | Turley et al. | 350/96.21 |
| 4,812,003 | 3/1989 | Dambach et al. | 385/86 |
| 4,818,057 | 4/1989 | Bruch | 385/86 |
| 4,838,641 | 6/1989 | Morimoto et al. | 385/87 |

Primary Examiner—John D. Lee
Assistant Examiner—John Ngo
Attorney, Agent, or Firm—Trexler, Bushnell, Giangiorgi & Blackstone

[57]  ABSTRACT

A strain relief is provided for use with a splice for optical fibers having a fiber channel for housing and guiding a buffered optical fiber. At least one section of the fiber channel has a diameter sufficient to accept the buffered optical fiber. The strain relief is located on this section of the fiber channel. The strain relief comprises a projection which is able to bite into a buffer on the optical fiber without causing compressive stress losses.

20 Claims, 3 Drawing Sheets

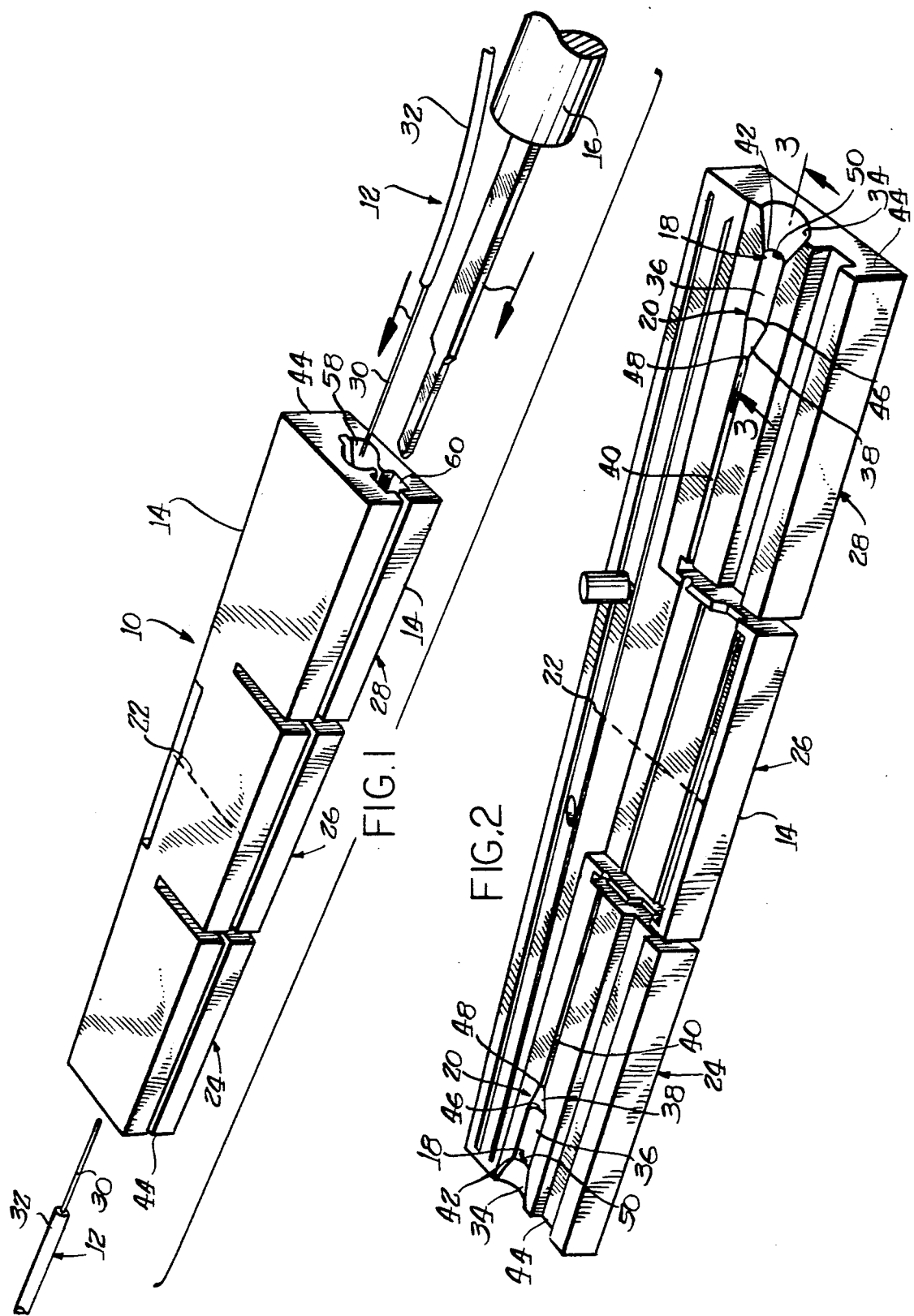

STRAIN RELIEF FOR OPTICAL FIBER

BACKGROUND OF THE INVENTION

The present invention generally relates to a novel and improved construction for achieving strain relief for an optical fiber within a splicer between such optical fibers. More specifically, the present invention relates to an improved construction of an optical fiber strain (or stress) relief for use in a polymer spring fiber optic splicer of the type disclosed in the co-pending U.S. Pat. application of Essert et al., Ser. No. 07/579,127, filed Sep. 6, 1990 still pending.

Optical fibers have become the method of choice in many modern applications. The greater transmission speeds available to users of optical fibers is one attractive benefit of using such fibers. Also, optical fibers provide greater signal transmission clarity, making optical fibers particularly desirable for application in telecommunications networks. However, optical fibers demand certain care in their employment; care that is not as necessary when using older, metallic wire transmission cables.

For instance, because the proper operation of optical fibers depends upon the physical phenomenon of total internal reflection of incident wave fronts, it is desirable that the glass cores of two succeeding optical fibers to be spliced together be aligned with great accuracy and precision. If the cores of the fibers are not so aligned, their misalignment can form an improperly configured reflective interface, resulting in signal distortion and loss. Also, misalignment of the cores may prohibit some signals, or portions thereof, from being completely internally reflected, thereby allowing the wave fronts to escape the transmission line at the splicer.

Even if the optical fiber are properly aligned initially at the splicer, they may become misaligned eventually due to the application of naturally generated forces, or of some other external force. Because optical fibers are often used in a telecommunications network, the splicer between two successive fibers must be able to withstand the forces inherent in that application in order to maintain the alignment of the fiber cores.

Specifically, for example, the optical fibers are subjected to thermal contraction and expansion depending upon the temperature of the ambient environment. Also, the fibers are subjected to forces generated by workmen who service the telecommunications network. The application of these forces can cause misalignment of the fibers, as well as thermal signal loss and torsionally induced failure of the cable and its individual fibers.

In the optical splicer disclosed in the above-referenced co-pending application, compressive or grip-type clamps are applied to the fibers within the splicer. However, to be effective, the clamps had to apply a force to the fibers of sufficient magnitude to resist the above-mentioned forces. Because the structure of the optical fiber is exacting in order to reap the benefits of total internal reflection, the use of the clamps sometimes results in compressive stress signal losses. Such losses have been observed primarily as a result of torsional failures, and primarily in one type of optical fiber, known as the 900 um tight buffered, non-separately strippable fiber. The strain relief of the present invention therefore provides a significant improvement in the grip-type splicer, and is especially desirable for employment with optical fibers similar to the above-described 900 um diameter fibers, which are particularly prone to torsional failure in such a splicer.

OBJECTS AND SUMMARY OF THE INVENTION

A general object of the present invention is to provide a optical splicer having strain relief.

An additional object of the present invention is to provide a optical splicer having means to prevent torsion induced failure of the optical fiber.

A related object of the invention is to provide a optical splicer having strain relief means which does not cause compressive stress losses in the fiber.

A further related object of the present invention is to provide an optical splicer having strain relief means which permits longitudinal flexing of the fiber when thermal expansion or contraction occurs.

A strain relief, constructed according to the teachings of the present invention, is provided for use with a splicer for a buffered optical fiber having a cable channel for housing and guiding a buffered optical fiber. At least one section of the fiber channel has a diameter sufficient to accept the buffered optical fiber. The strain relief means is located on the at least one section of the fiber channel. The strain relief means comprises a projection which is able to bite into a buffer on the optical fiber without causing compressive stress losses.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 1 is a perspective view of a optical splicer, constructed according to the teachings of the present invention, showing the construction thereof as well as the insertion points for the optical fibers and an operating tool;

FIG. 2 is a perspective view of one of the identically constructed housing halves which comprise the splicer;

DETAILED DESCRIPTION OF THE ILLUSTRATED EMBODIMENT

Figure 3:
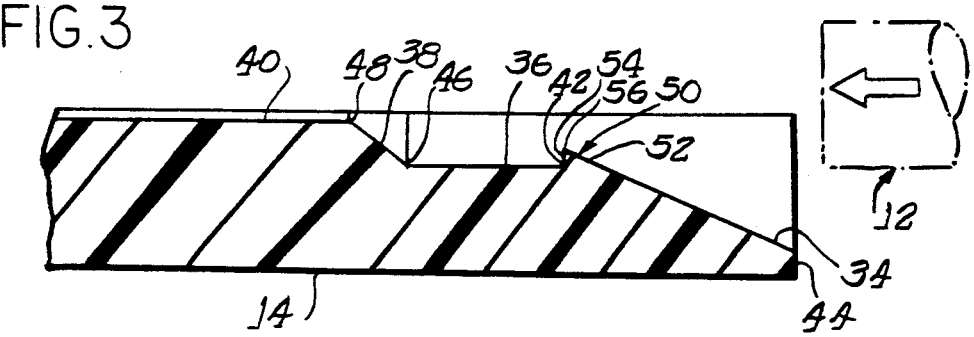
FIG. 3 is magnified sectional view, taken along line 3—3 of FIG. 2, showing the construction of a fiber channel and of the strain relief means of the invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Illustrated in FIG. 1 is an optical fiber splicer 10, capable of splicing two optical fibers 12 together, and having strain relief means 18 (see FIG. 2) constructed according to the teachings of the present invention. The splicer 10 is comprised of two mirror image, and preferably identically constructed outer housing half portions 14, thereby facilitating assembly. The two half portions 14 snap together, and can be partially separated to allow for insertion and removal of optical fibers by insertion and subsequent rotation of a particularly configured tool 16.

The detailed construction and operation of the splicer 10 is specifically disclosed in, and is the subject matter of the co-pending U.S. Pat. application of Essert et al., Ser. No. 07/579,127. The disclosure of that co-pending application is incorporated herein by this reference. Accordingly, the present disclosure will limit itself to discussion of the strain relief means 18 and the elements of the splicer 10 necessary to the proper understanding of the strain relief 18. For a greater understanding of the structure and operation of the splicer 10, reference should be had to the above-identified co-pending application.

While the strain relief means 18 of the present invention is illustrated and will be fully described with relation to employment with the splicer 10 and with a 900 um diameter tight buffered optical fiber, it is to be understood that the invention could be employed with other types of splicers, and other types of fiber receiving equipment, as well as other types of fibers, without departing from the invention.

Referring to FIG. 2, one of the identically constructed half portions 14 is shown. The half portion 14 has a fiber channel 20 which extends longitudinally along the half portion 14 from opposite ends thereof. In order to facilitate the non-handed construction of the splicer 10, the configuration of the fiber channel 20 is mirrored about a latitudinal midline 22 of the half portion 14.

The half portion 14 has essentially three major sections: a first fiber section 24, a splice section 26, and a second fiber section 28. The first fiber section 24 extends from one end of the half portion 14 a certain distance to the splice section 26. The splice section 26 extends from an end of the first fiber section 24 opposite an end of the half portion 14 to the second fiber section 28. The second fiber section 28 extends from the splice section 26 to an end of the half portion 14 opposite to the end thereof adjacent to the first fiber section 24. Splice sections 26 of the two halves receive corresponding halves of a splice element (not shown) which effects the splice by compressing or gripping respective fiber ends. The splice element is shown and described in the above-referenced, co-pending application.

The spliced connection between two optical fibers 12 is effected at the splicer portion 26, and the first and second fiber sections 24 and 28, respectively, guide the optical fibers 12 towards and into the splice section 26. The first and second fiber sections 24 and 28 are mirror images of each other about the latitudinal midline 22. Thus, the construction of the fiber sections 24 and 28 will be discussed with relation to only one thereof.

The fiber sections 24 and 28 each bear fiber channels 20 which are constructed to house and protect the optical fibers 12 and to guide them towards the splice section 26 for spliced joinder. The optical fibers 12 have a core 30, composed of an appropriate material, such as glass, and a buffer 32, which protects the fiber 12 from damage. In the case of a 900 um buffered fiber, the glass core is nominally 125 um in diameter. An inner coating is nominally 250 um outer diameter and is preferable a UV-acrylate material. The buffer surrounds this coating and has a nominal 900 um outer diameter and is preferably a PVC material in the loose buffered or separately strippable fiber construction, and a Hytrel TM material in the tight buffered or non-separately strippable construction.

The 900 um buffered fibers are separated into two classes, separately strippable, and non-separately strippable. as its name implies, the separately strippable, 900 um buffered fiber can be stripped in multiple steps. The first step removes the outer buffer, exposing the fiber coating, which has a diameter of 250 um or 500 um.

In the second step, the 250 um (or 500 um) acrylate coating can be removed. This exposes the bare glass of the 125 um fiber. When stripping the non-separately strippable 900 um buffer, it is not possible to expose the 250 um (or 500 um) coating. Instead, the buffer stripping process exposes the 125 um diameter bare glass in one step.

In order to effectuate proper alignment of the cores 30 to create an effective splice, the buffer 32 is stripped away from the fiber 12 a certain distance from the terminal ends of each fiber 12. However, an amount of the buffer 32 remains intact to protect the core 30. Thus, the fiber channels 20 must have differently sized sections; namely, a section for accepting the buffer-clad fiber 12, and another, smaller section for accepting the core 30.

Specifically, the fiber channels 20 each have at least a first section 34, a second section 36, a third section 38, and a fourth section 40. The first section 34 extends from an end 44 of the half portion 14 to a point 42 at which the first section 34 joins the second section 36. The first section 34 has a substantially semi-circular cross section taken along a line substantially parallel to the latitudinal midline 22, except for the presence of the strain relief means 18, as will be discussed herein below.

However, the first section 34 has an inner diameter which decreases gradually from the end 44 to the point 42. Thus, the first section 34 has semi-circular cross sections of gradually decreasing diameter. In this way, the first section 34 is substantially half-funnel shaped in configuration. This configuration allows the first section 34 to guide the fiber 12 from the exterior of the splicer 10 into the splicer 10 towards the splice section 26.

The second section 36 extends along the fiber sections 24 and 28 from the point 42 to a second point 46, which defines the demarcation between the second and third sections 36 and 38, respectively. The second section 36 also has a substantially semi-circular cross section taken along a line substantially parallel to the latitudinal midline 22.

However, as opposed to the first section 34, the second section 36 has an inner diameter of constant length, which is equal to the length of the inner diameter of the first section 34 at the point 42. Thus, the second section 36 is substantially half-cylindrical in configuration. The diameter of the second section 36 is of sufficient size to accept a optical fiber 12 having an intact 900 um buffer 32. It is to be noted, however, that the diameter of the second section 36 can be changed for employment with different diameter fibers 12.

The third section 38 extends from the second point 46 along the fiber sections 24 and 28 to a third point 48 which marks the juncture between the third section 38 and the fourth section 40. The third section 38, not unlike the first section 34, has a substantially semi-circular cross section of gradually decreasing diameter taken along a line substantially parallel to the latitudinal midline 22.

The diameter of the third section 38 gradually decreases from the second point 46, where the diameter is equal in length to the diameter of the second section 36, to the third point 48. Thus, the third section 38 is also substantially half-funnel shaped in configuration, which allows the third section 38 to effectively guide the fiber 12 from the second section 36 into the fourth section 40. At the third point 48, the third section 38 has a diameter equal in length to the diameter of the fourth section 40.

The fourth section 40 extends from the third point 48 to the splice section 26. The fourth section 40 is substantially half-cylindrical in configuration, having a constant diameter. The diameter of the fourth section 40 is of sufficient size to accept a optical fiber 12 having a 250 um coating intact, but, as with the second section 36, its size can be altered for employment with different effective diameters. Thus, the first through fourth sections 34 through 40 act as means for guiding the fibers 12 to the splice section 26.

As shown clearly in FIG. 3, strain relief means 18 in the form of a tooth, projection 50, or other strain relief element is disposed in the fiber channels 20. The projection 50 is located as far away from the splice section 26 as possible, so that the projection 50 is disposed the greatest distance possible away from a stripped portion of the optical fiber 12 while still allowing it to function properly. Accordingly, the projection 50 is located proximate to the point 42. With this construction, the point of action of any torsional forces applied to the fibers 12 will be disposed within the splicer 10 as far as possible from the bare fiber optic core 30, thereby reducing the likelihood of torsional damage, and also permitting some longitudinal bending of the fibers between the splice section 26 and the projection 50 to allow for thermal expansion and/or contraction.

Figure 4:
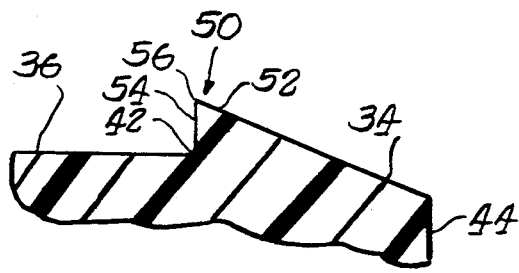
FIG. 4 is a magnified view of a portion of FIG. 3, giving a more detailed illustration of the strain relief means.

Referring to FIG. 4, the precise construction of the projection 50 will be disclosed. The projection 50 has a sloping side 52 and a straight side 54. The sloping side 52 is connected to the straight side 54 at an edge 56. Thus, the edge 56 defines a terminal end of both the sloping and the straight sides 52 and 54. Both the sloping and the straight sides 52 and 54 are substantially smooth and planar, while the edge 56 is sharp; the sharper, the better. However, the projection 50, and thus the edge 56 can be rounded or radiused, or possess any other configuration capable of functioning in a similar manner. The projection 50 has an effective width within the range of 0.003 to 0.005 inches.

The sloping side 52 follows the gradually reducing diameter construction of the first section 34 of the fiber channels 20. The surface of the sloping side 52 slopes downwardly along the fiber channel 20 from a diameter equal to the diameter of the first section 34 proximate to the point 42 to a diameter defined by the edge 56. Thusly, the sloping side 52 defines an acute angle relative to the surface of the fiber channels 20. The straight side 54, however, defines a substantially right angle relative to the surface of the fiber channels 20.

The sloping portion 52 and the first section 34 combined are substantially half-funnel shaped, and thereby guide the fiber 12 into the second section 36. The straight side 54 extends away from the edge 56 opposite to the sloping side 52. The straight side 54 is substantially perpendicular to the second section 36, and connects the edge 56 to the second section 36.

The projection 50 is only approximately 0.003 to 0.005 inches in width an an area where it engages the optical fiber 12. This projection 50 construction provides essentially point contact with the buffer 32 so that the fibers 12 can move under thermal influences sufficiently to prevent thermal signal loss. Also, the frictional forces between the buffer 32 and core 30 are small enough to allow slight movement of the fiber 12 within the splicer 10 to allow thermal expansion and/or compression while also being large enough to prevent adverse effects of undue torsional strain on the fibers 12. The projection 50 maintains control over the torsional stresses and strains applied to the fiber 12 so that the proper alignment of the spliced fibers 12 will not be altered. However, the projections 50 do not apply a force to the fibers 12 sufficient to cause compressive stress losses in the fibers 12.

The diameter defined by the edge 56 is somewhat smaller than the diameter of the second section 36. This allows the edge 56 to "bite into" the buffer 32 on the optical fiber 12 a certain distance on the order of no more than 0.005 inches, as will be discussed herein, shown in FIG. 5.

Figure 6:
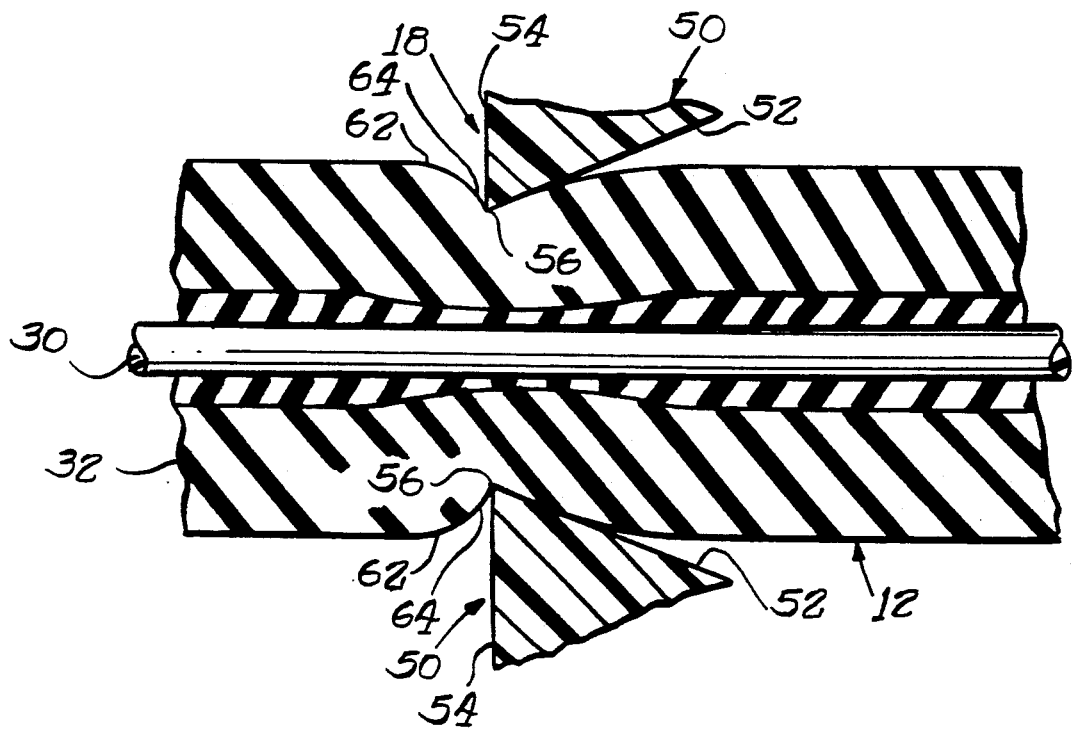
FIG. 6 is an enlarged partial sectional view of the optical splicer, illustrating the material of the buffer flowing around the strain relief.
Figure 7:
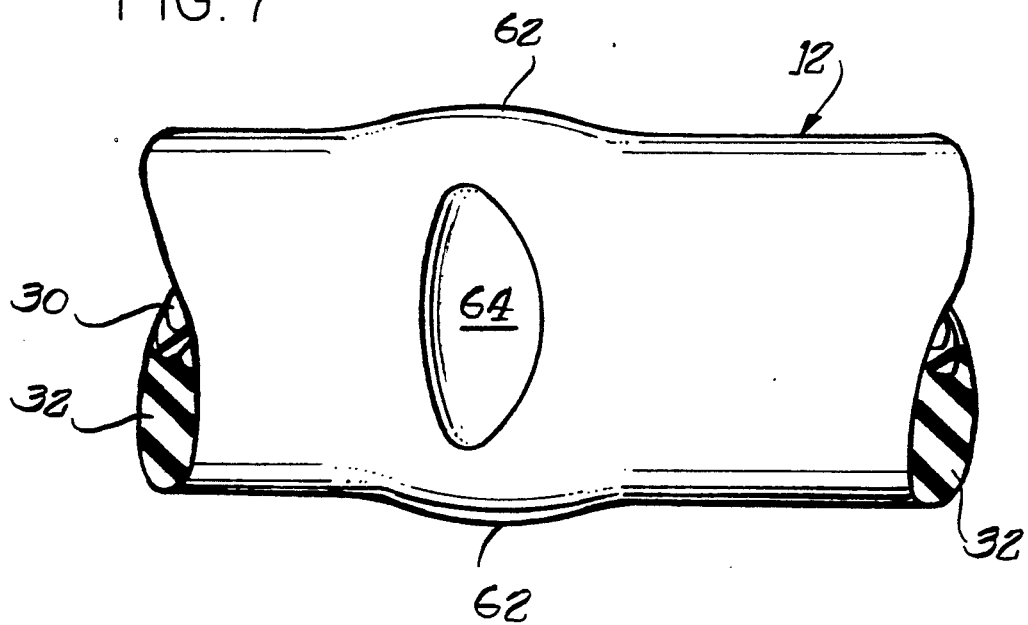
FIG. 7 is a top plan view of the optical fiber shown in FIG. 6 detailing the bulge and the indentation.

Refering to FIG. 6 and FIG. 7, the Hytrel TM material of the buffer 32 of a tight-buffered optical fiber 12 is very stiff and resilient. The strain caused by the force of the projection 50 is translated to the UV-acrylate coating beneath the buffer 32 without very much change. Since the UV-acrylate is quite soft and supple, it "flows" around the projection 50, allowing the Hytrel TM to take on a new shape without any substantial stresses being produced. As illustrated in FIG. 6, there is a slight bulge 62 of the Hytrel TM leaving an indentation 64. Suprisingly, the indentation 64 remains in the Hytrel TM even after the projection 50 is removed from engagement with the buffer 32, as shown in FIG. 7. The indentation 64 thusly provides a keyed effect in this type of fiber, thereby preventing rotation of the fiber 12.

With the relevant elements of the structure of the splicer 10 and the strain relief means 18 being disclosed, the operation thereof will be discussed. A more detailed description of the operation of the fiber splicer 10 is given in the above-referenced co-pending patent application of Essert et al..

To form the splicer 10, two identically constructed half portions 14 are fused together, encapsulating a splicer element, as discussed in the above-referenced application of Essert. The external configuration of the splicer 10 is as shown in FIG. 1.

As the two half portions 14 are fused together, their corresponding elements are joined. Specifically, the substantially half-cylindrical sections of the fiber channels 20, and the substantially half-funnel shaped sections thereof join to form substantially cylindrical and substantially funnel-shaped sections of the fiber channels. The projections 50 on each half portion 14 are joined to form strain relief means 18. Additionally, the first sections 34 define an opening 58 for accepting a optical fiber 12, as shown in FIG. 1. Also, a tool slot 60 is formed adjacent to the opening 58 for accepting the tool 16, as disclosed in the above-cited co-pending application of Essert. There is at least one opening 58 and one tool slot 60 on each opposite end of the splicer 10.

Additionally, the splice element, disclosed in the above-referenced co-pending application, is formed, and properly located.

The tool 16 is rotated, forcing the half portions 14 apart a certain distance. The tool 16 retains the separation between the half portions 14, allowing for insertion of the fibers 12. The fibers 12 have been properly prepared, that is, the buffers 32 have been sufficiently stripped, thereby exposing the cores 30. The degree to which the buffers 32 are stripped depends upon the size of the fiber 12. When using a 900 um diameter tight buffered optical fiber, for example, the buffer 32 is stripped so that the buffer 32 extends within the splicer 10 only to a portion of the third section 38. The fibers 12 are inserted until they encounter resistance caused by the splicer element. The fibers 12 are now properly aligned within the splicer 10.

Figure 5:
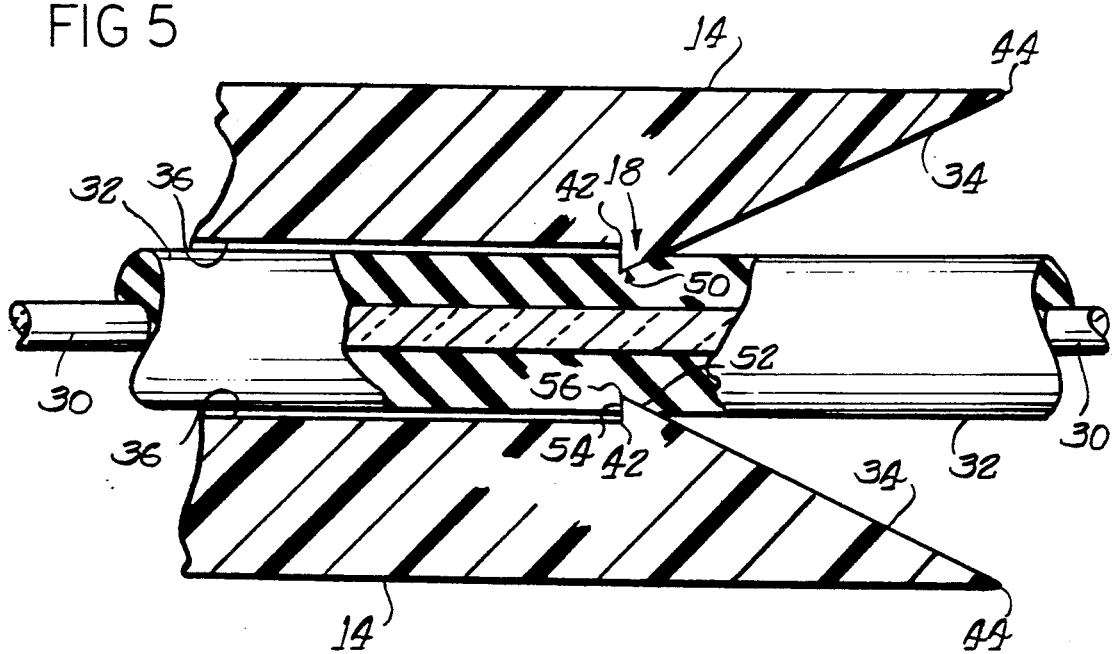
FIG. 5 is an enlarged sectional view of the optical splicer, illustrating the strain relief means biting into the buffer surrounding the optical fiber, thereby reducing the torsional stress thereon.

The tool 16 is again rotated and then withdrawn, allowing the half portions 14 of the splicer 10 to return towards their original, fused condition. As the half portions 14 return towards their original condition, the projections 50 cut or bite into the buffer 32, as shown in FIG. 5 and FIG. 6, thereby completing the strain relief means 18. The strain relief means 18 offers a substantial improvement.

Specifically, the strain relief means 18 can prevent torsionally induced failure of the fibers 12 by reducing the torsional strain thereon. However, the strain relief means does not apply such force to the fibers 12 as to cause compressive stress losses. Also, the generous length of optical fiber 12 disposed between the strain relief means 18 and the splice section 26 permits for longitudinal bending of the fibers 12 when thermal expansion/contraction occurs due to changes in the temperature of the ambient atmosphere. This prevents the occurrence of thermal loss. The strain relief means 18 is highly desirable for use with 900 um fibers, because those fibers display a sensitivity to torsional failure.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A splicer for connecting buffered optical fibers by means of a splice element within the splicer and having strain relief means, the splicer comprising: two mirror image half portions; a fiber channel formed on the half portions; the fiber channel having at least one section having a diameter sufficient to accept a buffered optical fiber; strain relief means located on the at least one section of the fiber channel for biting into a buffer on the optical fiber when the fiber is disposed in the fiber channel and the half portions are joined together; and the strain relief means being offset from the splice element a distance sufficient for allowing for thermal expansion of the fiber.

2. A splicer as defined in claim 1 wherein the strain relief means comprises a projection extending into the fiber channel.

3. A splicer as defined in claim 2 wherein the projection comprises a tooth-like element having a sloping side and a straight side the sloping side defining an acute angle and the straight side defining substantially a right angle relative to a surface of the at least one section of the fiber channel; and an edge connecting the sloping side to the straight side.

4. A splicer as defined in claim 3 wherein the edge is sufficiently sharp for biting into the buffer on the optical fiber.

5. A splicer as defined in claim 4 wherein the edge has an effective width of no more than approximately 0.005 inches.

6. A splicer as defined in claim 2 wherein the projection has a width within the range of 0.003 to 0.005 inches at an area where the projection engages the buffered optical fiber.

7. A splicer as defined in claim 3 wherein the edge is radiused.

8. A splicer having strain relief means as defined in claim 1 wherein the optical fiber has a stripped portion and a buffered portion; and the strain relief means being located within the splicer at a point farthest from the stripped portion when the optical fiber is within the splice element for allowing for thermal expansion of the fiber.

9. A splicer having strain relief means as defined in claim 1 wherein a splice section bearing the splice element is located on the splicer a distance away from the strain relief means so that a length of optical fiber sufficient for allowing thermal expansion and contraction of the fiber can be disposed between the splice section and the strain relief means.

10. A strain relief for use with a splicer for optical fibers including a fiber channel for housing and guiding a buffered optical fiber to a splice element with the splicer; at least one section of the fiber channel having a diameter sufficient for accepting the buffered optical fiber; the strain relief comprising: a strain relief element located on the at least one section of the fiber channel for biting into a buffer on the optical fiber without causing compressive stress losses; and the strain relief element being offset from the splice element a distance sufficient for allowing for thermal expansion of the optical fiber.

11. A strain relief as defined in claim 10 wherein the strain relief element comprises a projection extending into the fiber channel.

12. A strain relief as defined in claim 11 wherein the projection comprises a tooth-like element having a sloping side and a straight side; the sloping side defining an acute angle and the straight side defining substantially a right angle relative to a surface of the at least one section of the fiber channel; and an edge connecting the sloping side to the straight side.

13. A strain relief as defined in claim 12 wherein the edge is sufficiently sharp for biting into the buffer on the optical fiber.

14. A strain relief as defined in claim 12 wherein the operative width of the edge is no more than approximately 0.005 inches.

15. A strain relief as defined in claim 11 wherein the projection has a width within the range of 0.003 to 0.005 inches at an area where the projection engages the optical fiber.

16. A strain relief as defined in claim 10 wherein the strain relief bites into the buffer of the optical fiber to a depth of approximately 0.005 inches.

17. A strain relief as defined in claim 10 wherein the strain relief comprise a radiused edge.

18. A strain relief as defined in claim 10 which forms an indentation on the optical fiber when the strain relief element engages the fiber; the indentation remaining on the fiber after the fiber is removed from the splicer; and the indentation providing a keyed effect to prevent fiber rotation when the fiber is disposed within the splicer.

19. A strain relief as defined in claim 10 wherein the strain relief transversely engages the buffer on the optical fiber for allowing thermal expansion of the optical fiber while preventing thermal or compressive losses in the fiber.

20. A strain relief as defined in claim 10 wherein the strain relief is configured to provide a substantially linear engagement with the buffer on the optical fiber for preventing compressive and thermal losses in the fiber; a line substantially transverse to the fiber being defined by the linear engagement; and the linear engagement allowing pivoting of the fiber about the line for permitting thermal expansion of said fiber.

* * * * *